United States Patent [19]

Pallari

[11] 3,996,980
[45] Dec. 14, 1976

[54] CLEARING MACHINE FOR BRUSHWOOD

[76] Inventor: Kyösti Pallartri, 95385 Tervola, it., Finland

[22] Filed: Dec. 9, 1974

[21] Appl. No.: 531,044

[52] U.S. Cl. .............................. 144/34 E; 56/13.9; 56/255; 56/504
[51] Int. Cl.² .................. A01G 23/08; A01D 49/00
[58] Field of Search ............. 144/34 R, 34 E, 34 A; 56/500–504, 192, 255, 13.8, 13.9

[56] References Cited

UNITED STATES PATENTS

| 1,012,892 | 12/1911 | Meer .................................. 56/255 |
| 2,537,404 | 1/1951 | Garretson ........................... 56/256 |
| 3,673,779 | 7/1972 | Scanato .............................. 56/503 |
| 3,676,988 | 7/1972 | Hauser-Lienhard ............... 56/192 X |

FOREIGN PATENTS OR APPLICATIONS 1,578,285   8/1969   France ................................ 56/503

*Primary Examiner*—Gary L. Smith
*Attorney, Agent, or Firm*—Howson and Howson

[57] ABSTRACT

Apparatus for clearing brushwood or the like including a novel arrangement of shearing means and a brushwood material positioning means selectively adjustable to properly position the brushwood material for cutting and feeding to a chopping unit. The machine comprises a main frame mounting a pair of shearing units, each comprising stationary and rotary cutting elements rotatable in opposite directions toward one another to feed the cut brushwood material to a chopping unit for reducing it to chip size located generally centrally and rearwardly of the shearing units. The stationary and rotary cutting elements are of a predetermined relative configuration to accommodate cutting of relatievly large sized brushwood material. The machine also includes a pushing fork assembly comprising a linkage system and a pivotally mounted actuator whereby the height and longitudinal position of the pushing fork may be selectively varied in relation to the shearing units.

4 Claims, 3 Drawing Figures

3,996,980

CLEARING MACHINE FOR BRUSHWOOD

BACKGROUND OF THE INVENTION

This invention relates to a clearing machine for brushwood of the type having a stationary blade portion with projecting cutters and a rotary blade plate cooperating with the former, wherein the rotary blade plate comprises sickle-shaped cutters cooperating with the projecting cutters of the stationary blade portion.

Machines of the above-mentioned type are known to have been used as lawn mowers or as bush cutters. The known machines are not suitable for cutting and clearing of heavier brushwood the base diameter of which may be up to 15cm, due to the size of the machines and particularly due to the mutual working principle of the blades of such cutters.

Attention has recently been paid to the possibilities of using fast growing brushwood as raw material for board producing industry or for pulp and paper industry. One of the problems associated with the use of brushwood has been the lack of a suitable brushwood clearing machine.

An object of this invention is to solve the above problem and to provide a suitable machine for effective mechanical clearing of brushwood.

SUMMARY OF THE INVENTION

In broad terms, the present invention provides a machine for clearing brushwood or the like comprising a frame, at least one pair of cutting units mounted on the frame, each of said cutting units comprising shearing means including a stationary blade member having a plurality of circumferentially spaced cutter elements of generally triangular configuration and a rotary blade member cooperating with the cutter elements of the stationary blade member, means for rotating said rotary blade members in opposite directions and in a direction to advance materials cut rearwardly, a chopper unit for reducing the brushwood or the like to a chip form, the machine further including feeding means for advancing the cut brushwood or the like to the chopper unit, said feeding means including a plurality of feeding reels which are mounted to rotate with the rotary blade elements in opposite direction toward the chopper unit. Another feature of the present invention is the provision of pushing means extending forwardly and obliquely relative to the blades which comprise framework defining a pushing fork rearwardly and forwardly adjustable so that the point of contact of the brushwood in relation to the blades may be selectively varied in the longitudinal direction. By this arrangement, the timber is bent forwardly thus insuring that the cut timber is fed to the chopper unit base first.

The shearing means comprises a pair of cooperating stationary blade members and a rotor comprising rotary blade members. The stationary blade members have a plurality of circumferentially disposed cutter elements of generally triangular configuration and the rotor blade member has a plurality of circumferentially spaced shickle-shaped cutter elements cooperating with the cutter elements of the stationary blade member. The sickle-shaped cutting elements project in a circumferential direction in such a manner that they form with the stationary blade elements enclosed areas restricted by the cutters, which areas progressively decrease in size as the rotary and stationary blade members rotate relative to each other. In other words, the cutting point of each of the sickle-shaped elements moves from points adjacent the tip of the stationary cutter elements towards their basis. The shearing means further comprises pushing means engageable with the brushwood or the like forwardly of the blades and disposed at a predetermined height above the blades. Each of the sickle-shaped cutter elements defines a concavely curved cutting edge having a free end and a root end extending in a generally radially-circumferential direction along a curve.

BRIEF DESCRIPTION OF THE FIGURES

The invention will now be described in greater detail with reference to an embodiment shown in the accompanying drawings, in which.

DESCRIPTION OF A SPECIFIC EMBODIMENT

Figure 1:
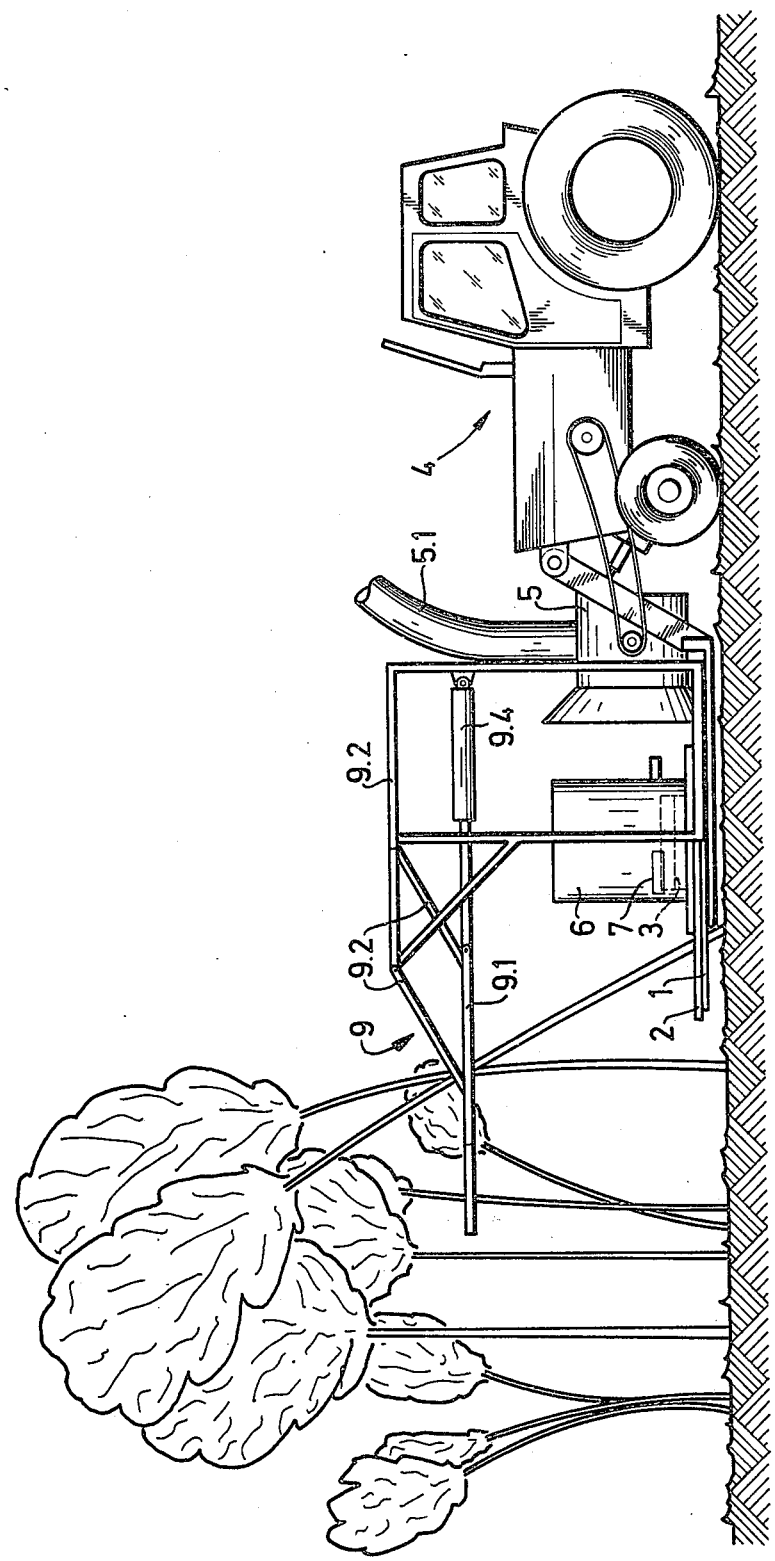
FIG. 1 is a side view of the machine according to the invention.
Figure 2:
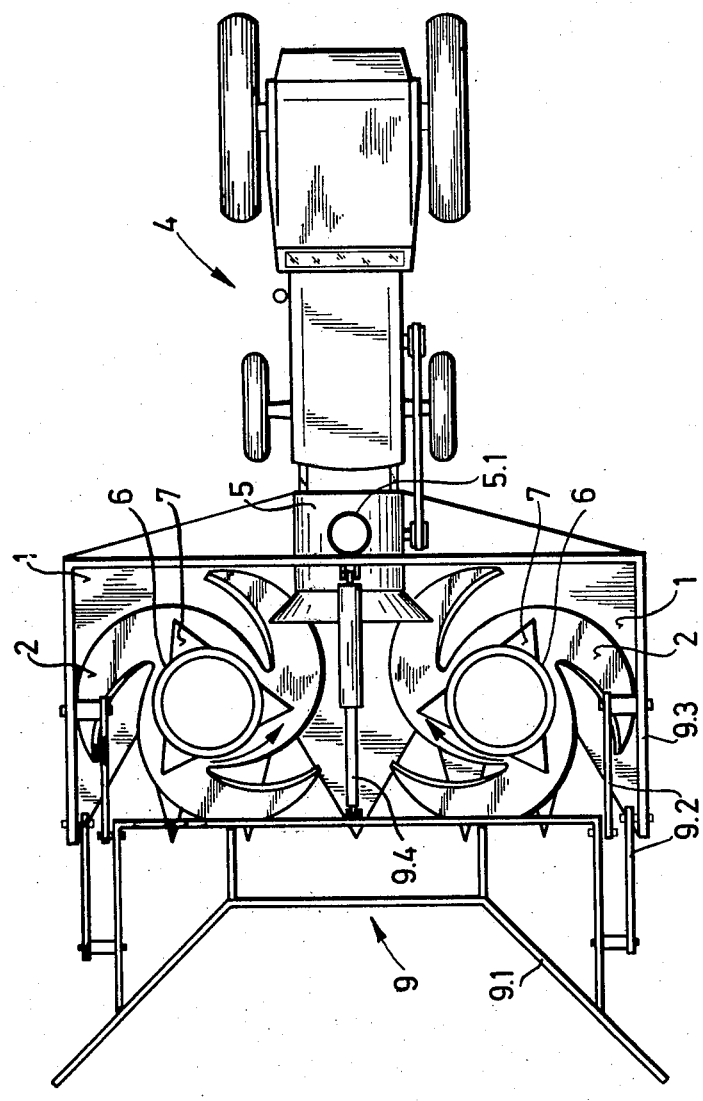
FIG. 2 is a plan view of the same.
Figure 3:
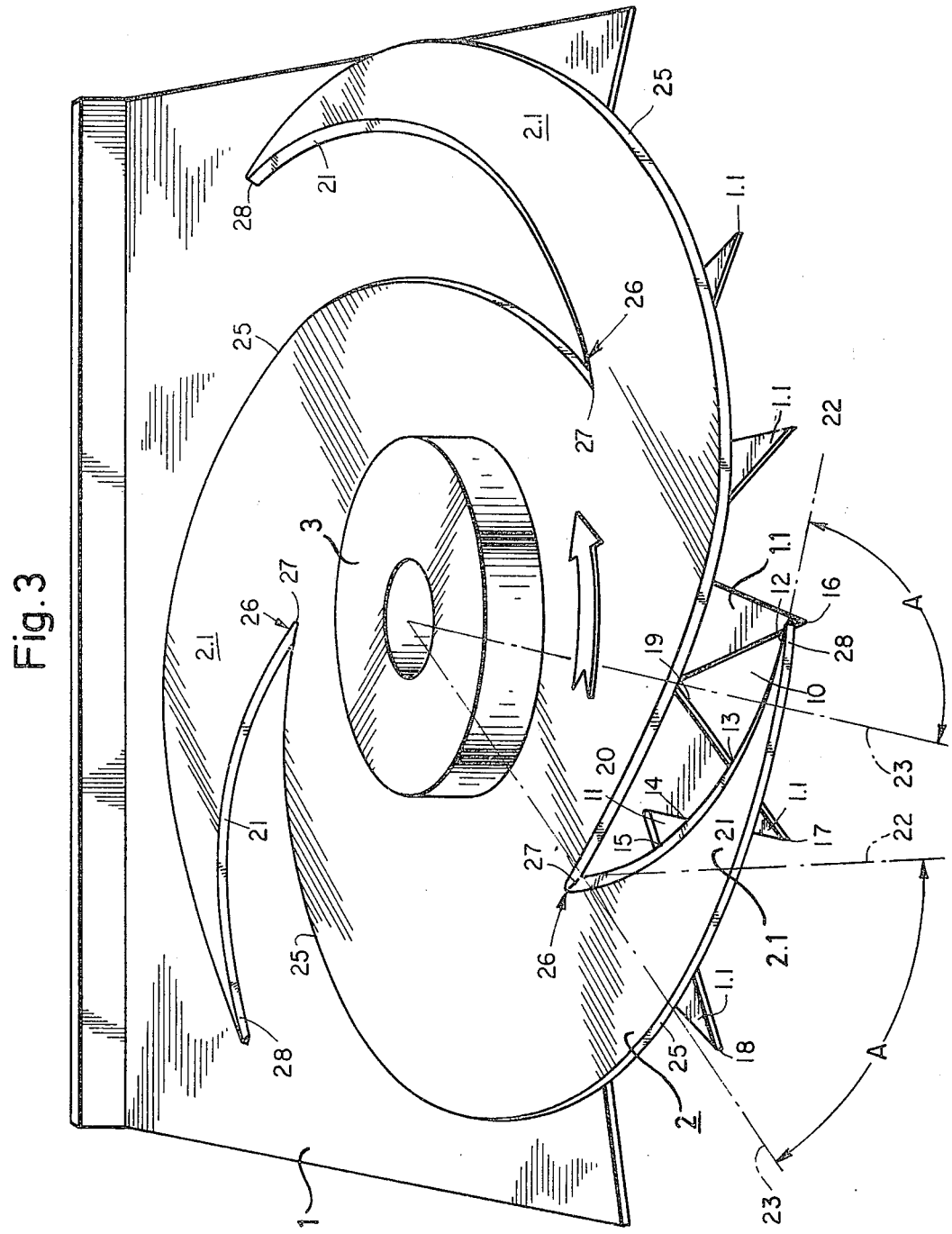
FIG. 3 shows the design of the blade portions of the machine in a greater detail.

The shown clearing machine for brushwood is secured to a mobile working machine of the type of a tractor 4, forwardly thereof. The device comprises a stationary plate 1 from the front edge of which project cutters 1.1. A rotary blade plate 2, also referred to as a rotor 2, is secured for pivotal movement on the stationary plate 1 in a generally horizontal plane. The rotor 2 comprises peripheral sickle-shaped cutters 2.1 extending in radial-peripheral direction with respect to the axis of rotation of the rotor 2. The cutters 2.1 are designed such that they form, together with the cutters 1.1 areas or openings which are completely surrounded by the cutters and which get progressively reduced in size as the blade plate 2 rotates in the direction of arrows shown in FIGS. 2 and 3. The rotation of blade plate 2 is effected by a hydraulic motor 3 (FIG. 1). As shown in FIG. 2, the apparatus comprises two rotary blades 2, one of such blades, forming shearing means with the stationary plate 1, being shown in greater detail in FIG. 3. Referring therefore to FIG. 3, it will be seen that shearing means is shown for a machine for clearing brushwood and having cooperating stationary blade members 1.1 and a rotor driven by a hydraulic motor 3. The stationary cutter elements 1.1 are disposed circumferentially and are of generally triangular configuration, while the rotary blade plate 2 comprises three circumferentially spaced, sickle-shaped cutter elements 2.1 cooperating with the cutter elements 1.1 of the stationary plate or blade member 1. As shown in FIG. 3, the sickle-shaped cutting elements 2.1 project in a circumferential direction in such a manner that they form with the stationary blade elements 1.1 enclosed areas 10, 11 which are each restricted by the cutters 1.1 and 2.1. It will be apparent that the areas 10, 11 progressively decrease in size as the rotary and stationary blade members 1, 2 are rotated relative to one another. It will be apparent that at mutual position as shown in FIG. 3, the cutter 21 facing the viewer of FIG. 3, defines a plurality of cutting points 12, 13, 14 and 15, the cutting points 12-15 being points at which the edge of the cutter 2.1 contacts the respective edges of cutters 1.1 defining the enclosed areas 10, 11. It will be apparent that the cutting points 12 through 15 move each from a location adjacent the tips 16, 17, 18 of the stationary cutter elements 1.1 towards their bases 19, 20. It will be seen that, for instance, the cutting point 12 is relatively remote from its associated base 19, while the cutting point 15 is relatively close to the base 20 as the enclosed area 11 is substantially reduced in size as compared with the area 10.

Each of the sickle-shaped cutter elements 2.1 defines a concavely curved cutting edge 21 which extends in a generally radially-circumferential direction along a curve which is concave with respect to the center of rotation of the rotor 2. The angle A between a tangent 22 touching the curve of the cutting edge 21 at any point thereof (two tangents shown in FIG. 3) and a radial line 23 passing through said point 24 and through the center of rotation of the rotor 2 is in a predetermined range to assure smooth action of the cutting edge 21 during the rotation of the rotor, without undesired flashing of brushwood.

It will be appreciated that the cutting edge 21 of each of the sickle-shaped elements 2.1 is a leading edge of the respective cutter 2.1. Each cutter 2.1 also has a trailing edge 25. The trailing edge of each of the cutters 2.1 is convexly curved to merge with root end 26 of the adjacent trailing cutter elements 2.1. The joinder 27 between the trailing edge 25 and between its associated cutting edge of the next cutter 2.1 is a point at which the cutting edge 26 and the trailing edge 25 meet at an acute angle.

The overall length of the cutting edge 21 of each of the sickle-shaped cutters 2.1 is sufficient to span one entire void or space between two adjacent stationary cutters 1.1 and at least a portion of a second void located forwardly of the tip of the sickle-shaped cutter 2.1 with respect to the rotation of the rotor 2. Thus, the areas 10, 11 can also be referred to as a first void 11 and a second void 10. It will be observed that the above relationship between the overall length of the cutting edge 21 and the voids 11, 10 is present in the embodiment of FIG. 3. In other words, on closing of the second void 10 by the leading end 28 of the cutter edge 21 of the sickle-shaped cutter 2.1, the trailing end (coincident with the root end 26) is still radially spaced from an inside end of the first void 11. Thus, the first void and the second void together with the cutter edge 21 of the foremost sickle-shaped cutter 2.1 in FIG. 2 define two enclosed, generally triangular openings corresponding in shape to the above referred enclosed areas or voids 10, 11.

The above described mutual agreement and motion of the cutters 2.1 relative to cutters 1.1 ensures that the brushwood to be cut does not give way in front of the cutters but as the cutting points moved toward the basis of the cutters, the brushwood material normally tending to give way is also properly cut due to the gradual restriction of the enclosed area 10, 11. The above-noted arrangement is furthermore important as it facilitates the cutting of relatively thick small timber. As the cutter 2.1 extends substantially in the direction of the periphery, the cutting effect produced by same is similar to a slicing effect over a relatively large angle of rotation of the rotor 2. This effectively avoids the squeezing of workpiece between two cutters which would result in a rugged operation of the rotor. Moreover, the squeezing would result in failure to cut relatively large trees (e.g., those over 5cm in diameter). The rotational velocity and mass of the blade plates 2 can be selected to suit cutting of relatively large trees. Preliminary tests of the present invention have shown that it is possible to cut down trees having the base diameter up to 10 or 15 cm.

In operation, the cut timber falls upon the rotating blade 2 from where it is fed to the rear end of the plate 1. In the embodiment shown in FIGS. 1 and 2, two cutting units are arranged side by side revolving each in a direction opposite to the direction of rotation of the other unit. Consequently, the cut timber is brought between the two rotors and fed towards a chopper 5 through the space between the rotors 2. The feeding to the chopper 5 is facilitated by means of feed reels 6 placed on the rotors 2 to rotate in common with same. The feeding reel 6 is provided, on periphery thereof, with triangular plates 7 which assist in feeding the timber to the chopper 5. The chips produced by chopper 5 are then removed in a known way and deposited e.g., to a loading bed which is arranged immediately beside the machine (the loading bed not shown in the drawings), by means of a blower and pipe 5.1. Obviously, the loading bed can be secured to the rear end of the tractor 4 but it is preferred that it be entirely separate from same.

A further feature of the present invention is in the provision of pushing means 9 extending forwardly obliquely above the blades and used (FIG. 1) in bending the timber forwardly away from tractor 4 thus insuring that the cut timber is fed to the chopper 5 with their bases first. The pushing means 9 includes a pushing fork 9.1 which is suspended from a stationary body portion 9.3 of the pushing means, by means of link arms 9.2. Thus, the assembly of the pushing means makes it possible to selectively adjust the height and overall position of the pushing fork 9.1, by use of a hydraulic piston-cylinder apparatus 9.4.

Those skilled in the art will appreciate that different modifications of the embodiment as described above are possible, without departing from the scope of the present invention. For instance, the overall arrangement of the shearing means on a cutting machine can differ from that shown in FIGS. 1 and 2. The mobile unit of tractor 4 as shown in the above embodiment can, of course, be changed to a different type. The cutting unit may extend to one side of the mobile machine to render same suitable for cutting down roadside brushwood. The rotation of rotor or rotors 2 can be effected by means of a chain drive, belt drive or the like. These and other modifications, however, do not depart from the scope of the present invention as set forth in the accompanying claims.

I claim:

1. Machine for clearing brushwood or the like comprising a frame, at least one pair of cutting units mounted on said frame, each of said cutting units comprising a stationary blade member having a plurality of circumferentially spaced cutter elements of generally triangular configuration and a rotary blade member cooperating with the cutter elements of the stationary blade member, said rotary blade member having a plurality of circumferentially spaced sickle-shaped cutter elements cooperating with the cutter elements of the stationary blade member, said sickle-shaped cutting elements projecting in a circumferential direction in such a manner that they form with the stationary blade elements enclosed areas restricted by the cutters which areas grow progressively smaller as the rotary and stationary blade members are rotated relative to one another and the cutting point of the sickle-shaped elements moves from points adjacent the tips of the stationary cutter elements toward their bases, means for rotating said rotary blade members in opposite directions and in a direction to advance materials cut rearwardly, a chopper unit for reducing the brushwood or the like to a chip form, disposed rearwardly of said shearing means, feeding means for advancing the cut brushwood to the chopper unit including a plurality of feeding reels mounted to rotate with said rotary blade elements in mutually opposite directions and pushing means engageable with the brushwood or the like forwardly of the blades and disposed at a predetermined height above the blades.

2. A machine as claimed in claim 1 wherein the feeding reels are triangular plates.

3. Machine for clearing brushwood or the like comprising a frame, at least one pair of cutting units mounted on said frame, each of said cutting units comprising a stationary blade member having a plurality of circumferentially spaced cutter elements of generally triangular configuration and a rotary blade member cooperating with the cutter elements of the stationary blade member, said rotary blade member having a plurality of circumferentially spaced sickle-shaped cutter elements cooperating with the cutter elements of the stationary blade member, said sickle-shaped cutting elements projecting in a circumferential direction in such a manner that they form with the stationary blade elements enclosed areas restricted by the cutters which areas grow progressively smaller as the rotary and stationary blade members are rotated relative to one another and the cutting point of the sickle-shaped elements moves from points adjacent the tips of the stationary cutter elements toward their bases, pushing means engageable with the brushwood or the like forwardly of the blades and disposed at a predetermined height above the blades, said pushing means including a framework defining a pushing fork which is rearwardly and forwardly adjustable so that the point of contact of the brushwood in relation to the blades may be selectively varied in the longitudinal direction.

4. A machine as claimed in claim 3 wherein said pushing fork is suspended from the supporting structure by means of a plurality of link arms arranged to define a four-link mechanism and including actuator means operatively connected to said pushing fork and link mechanism to selectively vary the height and longitudinal position of the pushing means in relation to the forward edge of the cutting elements.

* * * * *